US012759595B2

(12) United States Patent
Nemoto

(10) Patent No.: US 12,759,595 B2
(45) Date of Patent: Oct. 13, 2026

(54) VEHICLE CONTROL DEVICE, VEHICLE CONTROL METHOD AND VEHICLE CONTROL COMPUTER PROGRAM

(71) Applicant: TOYOTA JIDOSHA KABUSHIKI KAISHA, Toyota (JP)

(72) Inventor: Hiromi Nemoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 18/637,978

(22) Filed: Apr. 17, 2024

(65) Prior Publication Data

US 2024/0400113 A1 Dec. 5, 2024

(30) Foreign Application Priority Data

Jun. 1, 2023 (JP) ................................ 2023-090900

(51) Int. Cl.
*B60W 60/00* (2020.01)
*B60W 50/14* (2020.01)

(52) U.S. Cl.
CPC ........ *B60W 60/0051* (2020.02); *B60W 50/14* (2013.01); *B60W 2420/403* (2013.01); *B60W 2540/223* (2020.02)

(58) Field of Classification Search
CPC ............... B60W 60/005; B60W 50/14; B60W 2420/403; B60W 2540/223; B60W 60/0053; B60W 60/0051
USPC ............................................................ 701/23
See application file for complete search history.

(56) References Cited

U.S. PATENT DOCUMENTS

| | | | | |
|---|---|---|---|---|
| 2012/0016804 | A1 | 1/2012 | Lin et al. | |
| 2018/0345988 | A1 | 12/2018 | Mimura et al. | |
| 2019/0278264 | A1 | 9/2019 | Oyama et al. | |
| 2021/0016804 | A1* | 1/2021 | Hara | B60W 60/0057 |
| 2021/0300403 | A1* | 9/2021 | Kuwabara | B60W 60/0057 |
| 2022/0234599 | A1* | 7/2022 | Tsuji | B60W 50/0098 |
| 2024/0043031 | A1* | 2/2024 | Okada | B60W 60/0053 |
| 2024/0174247 | A1* | 5/2024 | Yamaguchi | B60W 40/09 |

FOREIGN PATENT DOCUMENTS

| | | | |
|---|---|---|---|
| JP | 2018-203013 | A | 12/2018 |
| JP | 2019-116182 | A | 7/2019 |
| JP | 2019-156058 | A | 9/2019 |
| JP | 2021-017112 | A | 2/2021 |

* cited by examiner

*Primary Examiner* — Matthias S Weisfeld
*Assistant Examiner* — Preston Jay Miller
(74) *Attorney, Agent, or Firm* — Sughrue Mion, PLLC

(57) ABSTRACT

A vehicle control device includes: a processor configured to: determine whether or not a situation around a vehicle or a situation of a driver of the vehicle satisfies a predetermined warning condition in a case where a driving control of the vehicle is executed without the driver holding a steering wheel, notify the driver of a hands-on request for holding the steering wheel and a warning that the driver does not hold the steering wheel via a notification device when the predetermined warning condition is satisfied, determine whether or not the driver holds the steering wheel in response to an in-vehicle sensor signal from an in-vehicle sensor that detects an action of the driver, and continue the warning until the driver holds the steering wheel even if the predetermined warning condition is no longer satisfied after the hands-on request is notified.

4 Claims, 5 Drawing Sheets

VEHICLE CONTROL DEVICE, VEHICLE CONTROL METHOD AND VEHICLE CONTROL COMPUTER PROGRAM

FIELD

The present invention relates to a vehicle control device, a vehicle control method, and a computer program for controlling a vehicle.

BACKGROUND

Depending on a level of autonomous driving control applied to a vehicle, a driver of the vehicle is allowed to release his/her hand from a steering wheel of the vehicle during the autonomous driving control of the vehicle. A technique has been proposed in which a driver is required to hold a steering wheel depending on a situation, when such a level of autonomous driving control is applied to a vehicle (see Japanese Unexamined Patent Publication JP2021-17112A).

The driving support apparatus disclosed in JP2021-17112A notifies a driver via a notification device of a request for holding a steering wheel while alerting the driver via the notification device, when it is determined that the condition of the driver is an inappropriate condition for monitoring the surroundings of the vehicle.

SUMMARY

In some cases, a factor leading to notification of a request for holding a steering wheel (hereinafter, referred to as a hands-on request or a holding request) may be resolved before the driver holds the steering wheel after the hands-on request is made. In such a case, if the vehicle control device withdraws the hands-on request and releases the hands-off warning without the driver holding the steering wheel, the driver learns that the hands-off warning is released without holding the steering wheel, and thus there is a possibility that the driver will not follow the hands-on request.

It is an object of the present invention to provide a vehicle control device that can suppress a driver from ignoring a hands-on request.

According to one embodiment, a vehicle control device is provided. The vehicle control device includes: a processor configured to: determine whether or not a situation around a vehicle or a situation of a driver of the vehicle satisfies a predetermined warning condition in a case where a driving control of the vehicle is executed without the driver holding a steering wheel, notify the driver of a hands-on request for holding the steering wheel via a notification device when the predetermined warning condition is satisfied, notify the driver of a warning that the driver does not hold the steering wheel via the notification device when the predetermined warning condition is satisfied, determine whether or not the driver holds the steering wheel in response to an in-vehicle sensor signal from an in-vehicle sensor that detects an action of the driver, and continue the warning until the driver holds the steering wheel even if the predetermined warning condition is no longer satisfied after the hands-on request is notified.

In this vehicle control device, it is preferable that the processor increases an intensity of the warning as an elapsed time from the notification of the hands-on request becomes longer, and the processor stops the warning even if the driver does not hold the steering wheel when the predetermined warning condition is no longer satisfied while the intensity of the warning is a first strength, and continues the warning until the driver holds the steering wheel even if the predetermined warning condition is no longer satisfied while the intensity of the warning is a second strength stronger than the first strength.

Further, it is preferable that the processor is further configured to control the vehicle to stop the vehicle when the driver does not hold the steering wheel until a predetermined grace period elapses after the intensity of the warning is changed to the second strength.

According to another embodiment, a vehicle control method is provided. The vehicle control method includes: determining whether or not a situation around a vehicle or a situation of a driver of the vehicle satisfies a predetermined warning condition in a case where a driving control of the vehicle is executed without the driver holding a steering wheel; notifying the driver of a hands-on request for holding the steering wheel via a notification device when the predetermined warning condition is satisfied; notifying the driver of a warning that the driver does not hold the steering wheel via the notification device when the predetermined warning condition is satisfied; determining whether or not the driver holds the steering wheel in response to an in-vehicle sensor signal from an in-vehicle sensor that detects an action of the driver; and continuing the warning until the driver holds the steering wheel even if the predetermined warning condition is no longer satisfied after the hands-on request is notified.

According to still another embodiment, a non-transitory recording medium that stores a computer program for vehicle control is provided. The computer program includes instructions causing a processor mounted on a vehicle to execute a process including: determining whether or not a situation around a vehicle or a situation of a driver of the vehicle satisfies a predetermined warning condition in a case where a driving control of the vehicle is executed without the driver holding a steering wheel; notifying the driver of a hands-on request for holding the steering wheel via a notification device when the predetermined warning condition is satisfied; notifying the driver of a warning that the driver does not hold the steering wheel via the notification device when the predetermined warning condition is satisfied; determining whether or not the driver holds the steering wheel in response to an in-vehicle sensor signal from an in-vehicle sensor that detects an action of the driver; and continuing the warning until the driver holds the steering wheel even if the predetermined warning condition is no longer satisfied after the hands-on request is notified.

The vehicle control device according to the present disclosure has an advantageous effect of being able to suppress a driver from ignoring a hands-on request.

DESCRIPTION OF EMBODIMENTS

Hereinafter, a vehicle control device, a vehicle control method executed on the vehicle control device, and a computer program for vehicle control will be described with reference to the attached drawings. Even if a cause for notifying a hands-on request is resolved after notifying a driver of the hands-on request, the vehicle control device continues to notify the driver of a warning that the driver does not hold the steering wheel (hereinafter referred to as a hand-off warning) until the driver actually holds the steering wheel.

Figure 1:
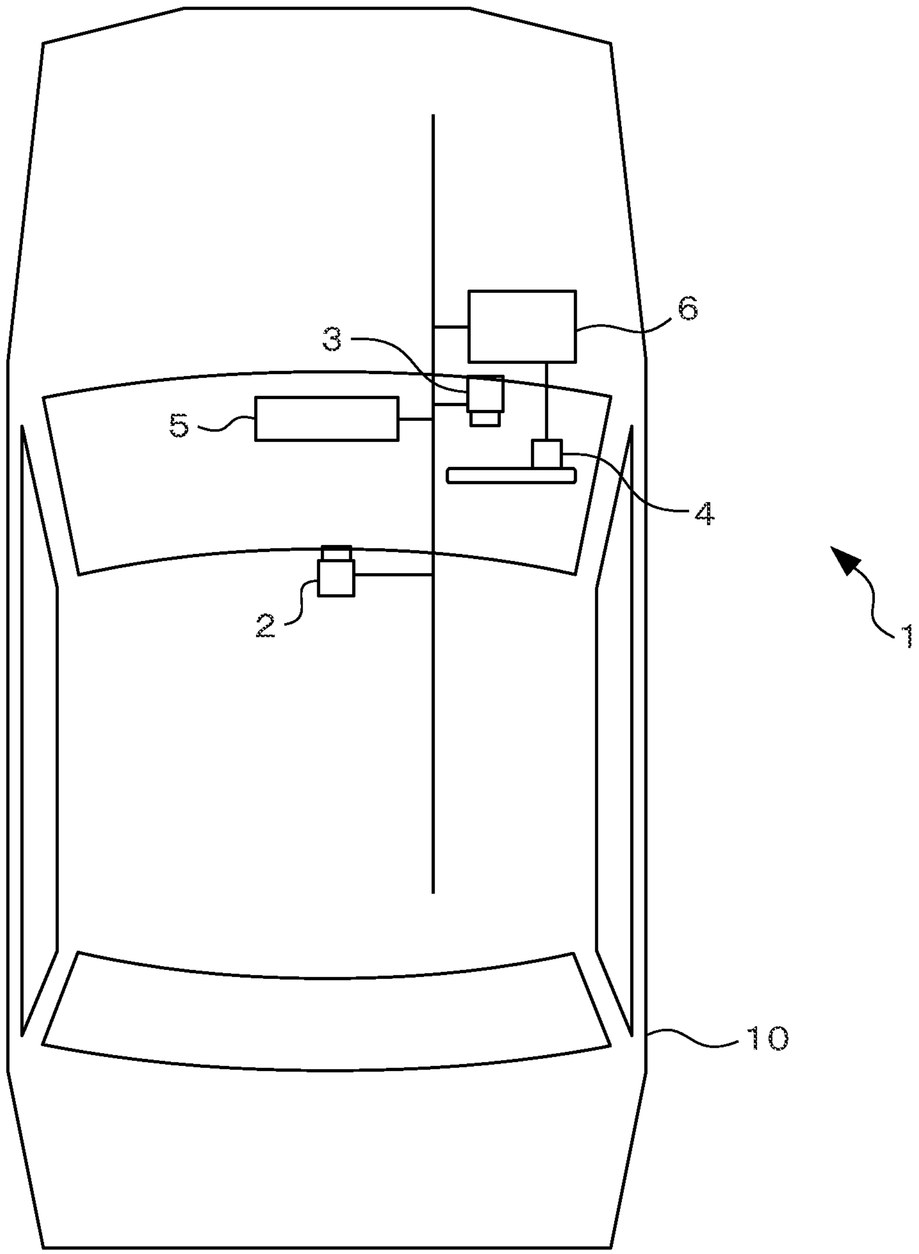
FIG. 1 schematically illustrates the configuration of a vehicle control system equipped with a vehicle control device.
Figure 2:
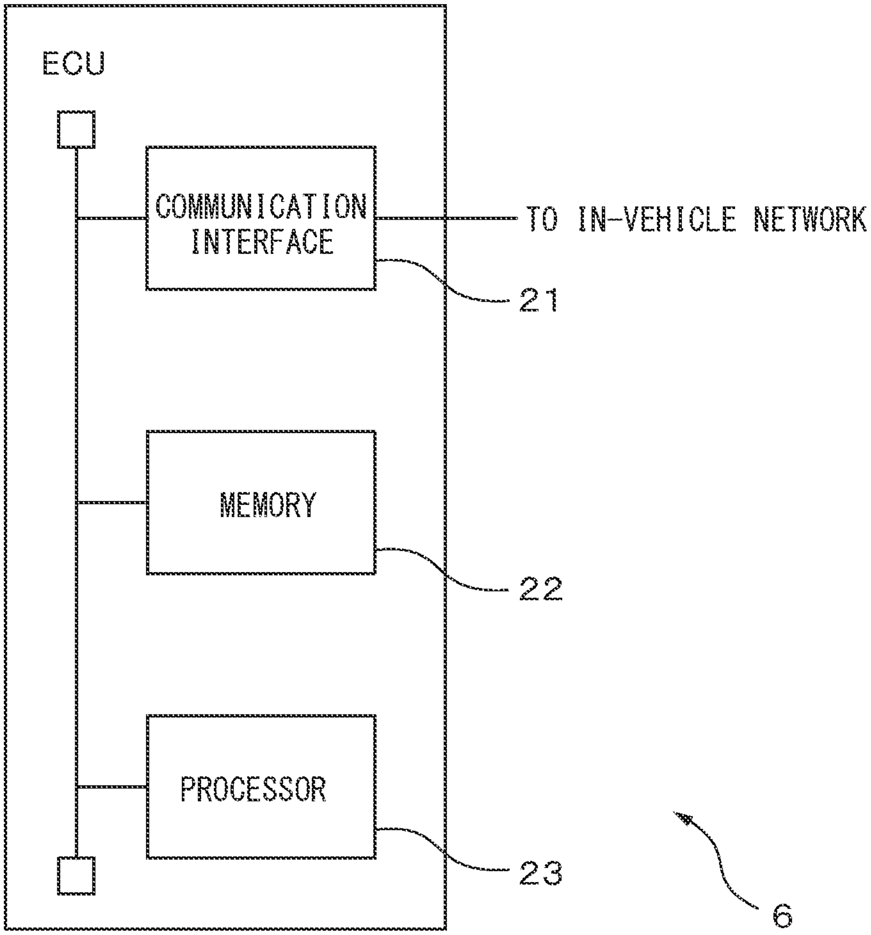
FIG. 2 illustrates the hardware configuration of an electronic control unit.

FIG. 1 schematically illustrates the configuration of a vehicle control system equipped with the vehicle control device. FIG. 2 illustrates the hardware configuration of an electronic control unit, which is an embodiment of the vehicle control device. In the present embodiment, the vehicle control system 1, which is mounted on the vehicle 10 and controlling the vehicle 10, includes a camera 2, a driver monitor camera 3, a touch sensor 4, a notification device 5, and an electronic control unit (ECU) 6 that is an example of the vehicle control device. The vehicle control system 1 may further include a range sensor (not illustrated) that measures a distance from the vehicle 10 to an object existing around the vehicle 10, such as a LiDAR or a radar. In addition, the vehicle control system 1 may further include a satellite-positioning device (not illustrated) such as a GPS receiver.

The camera 2 is an example of an external sensor, and is mounted, for example, in a vehicle interior of the vehicle 10 so as to be oriented to the front of the vehicle 10. The camera 2 generates an image representing a predetermined area around the vehicle 10 at every predetermined capturing cycle, and outputs the generated image to ECU 6.

The driver monitor camera 3 is an example of an in-vehicle sensor that detects the behavior of the driver, and is attached to, for example, the instrument panel or the vicinity thereof so that the head of the driver seated on the driver seat of the vehicle 10 is included in an imaging target area of the driver monitor camera 3. Then, the driver monitor camera 3 generates an image representing the driver (hereinafter referred to as a driver image) by capturing the driver at every predetermined capturing cycle, and outputs the generated driver image to ECU 6. The driver image is an example of an in-vehicle sensor signal.

The touch sensor 4 is another example of an in-vehicle sensor, and is attached to the steering wheel, and outputs a detection signal indicating that the driver has held the steering wheel to ECU 6 when the touch sensor 4 detects that the driver has held the steering wheel. The detection signal is another example of an in-vehicle sensor signal.

The notification device 5 is provided in the interior of the vehicle 10, and is a device that gives a predetermined notification to the driver by light, sound, vibration, or display of text or an image. For this purpose, the notification device 5 includes, for example, at least one of a speaker, a light source, a vibrator, and a display device. When the notification device 5 receives a notification signal representing a predetermined warning from ECU 6, such as a hands-on request to the driver, the notification device 5 notifies the driver of the warning by the voice from the speaker, the emission or flashing of the light source, vibration of the vibrator, or displaying a message on the display device. Note that the notification may be executed by the notification device 5 via each of two or more types of devices.

ECU 6 executes autonomous driving control of the vehicle 10 or supports driving of the vehicle 10 by the driver. Further, ECU 6 notifies the driver of the hands-on request via the notification device 5 when a predetermined warning condition is satisfied while the ECU 6 is executing the autonomous driving control of the vehicle 10 without the driver holding the steering.

As illustrated in FIG. 2, the ECU 6 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 6 to other devices. The communication interface 21 passes an image, a driver image, or a detection signal received from the camera 2, the driver monitor camera 3, and the touch sensor 4 to the processor 23. In addition, the communication interface 21 outputs the notification signal received from the processor 23 to the notification device 5.

The memory 22 is an example of a storage unit, and includes, for example, a volatile semiconductor memory and a non-volatile semiconductor memory. The memory 22 stores various types of data used in the vehicle control processing executed by the processor 23. Further, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes vehicle control process on the vehicle 10 at predetermined intervals.

Figure 3:
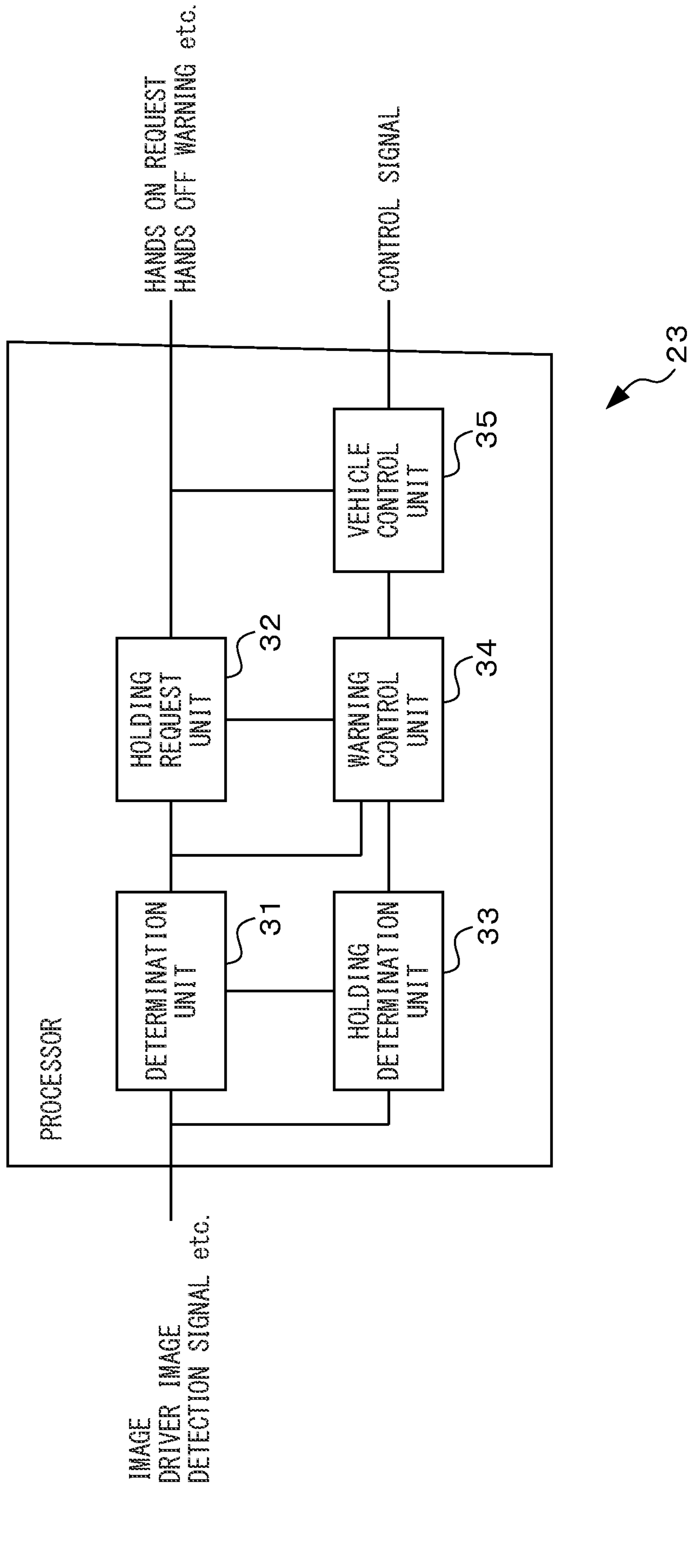
FIG. 3 is a functional block diagram of a processor of the electronic control unit, related to a vehicle control process.

FIG. 3 is a functional block diagram of the processor 23, related to the vehicle control process. The processor 23 includes a determination unit 31, a holding request unit 32, a holding determination unit 33, a warning control unit 34, and a vehicle control unit 35. Each of these units included in the processor 23 is, for example, a functional module implemented by a computer program running on the processor 23. Alternatively, each of these units may be a dedicated arithmetic circuit provided in the processor 23.

When a driving control of the vehicle 10 is executed without the driver holding a steering wheel, the determination unit 31 determines whether or not a predetermined warning condition is satisfied. The predetermined warning condition is a condition that may make it inappropriate for ECU 6 to continue the driving control of the vehicle 10 without the driver holding the steering wheel. The holding of the steering wheel by the driver is determined by the holding determination unit 33 described later.

For example, the determination unit 31 determines whether or not the situation around the vehicle 10 satisfies the predetermined warning condition. As an example, the determination unit 31 determines that the predetermined warning condition is satisfied when the distance between the lane division line that partitions the host lane in which the vehicle 10 is traveling and the vehicle 10 is less than the predetermined distance.

The determination unit 31 inputs the image obtained by the camera 2 to the classifier to detect the left and right lane division lines that divide the host lane represented in the image. Then, the determination unit 31 estimates, for each of the left and right lane division lines, the position of the lane division line corresponding to a reference position on the image with respect to the camera 2 based on the reference position and the parameters of the camera 2 such as the focal length, the imaging direction, and the installation height. The reference position is a position of the pixel in which the lane division line is represented at the position closest to the lowermost end of the image. Then, the determination unit 31 calculates a distance from the vehicle 10 to each of the left and right lane dividing lines based on the estimation result and the attachment position of the camera 2.

The determination unit 31 may detect the lane division line by inputting an image to a classifier learned in advance so as to detect the lane division line from the image. The determination unit 31 may use a deep neural network (DNN) having a convolutional neural network (CNN) type architecture, such as a Single Shot MultiBox Detector, as such a classifier. Alternatively, the determination unit 31 may use a classifier based on another machine-learning technique, such as a AdaBoost classifier, as such a classifier. Such a classifier has been learned in advance according to a predetermined learning method such as a back propagation method using a large number of teacher images in which a lane dividing line to be detected is represented so as to detect the lane dividing line from an image.

In addition, the determination unit 31 may determine that the warning condition is satisfied when the distance between a surrounding vehicle traveling around the vehicle 10 and the vehicle 10 is less than a predetermined distance. In this case, the determination unit 31 may detect the surrounding vehicle by inputting an image to a classifier, and estimate the distance between the vehicle 10 and the surrounding vehicle based on the position of the lower end of the region where the surrounding vehicle is represented on the image and the parameter of the camera 2. Alternatively, in a case where a range sensor (not illustrated) is mounted on the vehicle 10, the determination unit 31 may estimate the distance measured by the range sensor with respect to the azimuth corresponding to a centroid of the region in which the surrounding vehicle is represented as the distance between the vehicle 10 and the surrounding vehicle.

Further, the determination unit 31 may determine whether or not the state of the driver satisfies the predetermined warning condition. As an example, the determination unit 31 determines that the warning condition is satisfied when the direction of the driver's face is oriented in a direction different from the traveling direction of the vehicle 10.

The determination unit 31 inputs the driver image to a classifier learned in advance so as to detect the driver's face from the driver image, thereby detecting a region in which the driver's face is represented on the driver image (hereinafter referred to as a face region), and detecting a plurality of feature points of the driver's face, such as corners of eyes, head of eyes, a nasal tip, corners of mouth, and the like. At this time, the determination unit 31 detects the feature points of the face and the face region by inputting the driver image to a classifier learned in advance so as to detect the feature points of the face and the face region represented in the image. As such a classifier, the determination unit 31 can use, for example, a DNN having a CNN type architecture, a support vector machine, or a AdaBoost classifier. Note that the determination unit 31 may detect the face region and the feature points of the face from the driver image according to another method of detecting the face region and the feature points of the face, such as template matching.

The determination unit 31 fits each detected feature point of the face to a three-dimensional face model representing the three-dimensional shape of the face. Then, the determination unit 31 detects the direction of the face of the three-dimensional face model at the time when each feature point fits to the three-dimensional face model most, as the direction of the face of the driver. The determination unit 31 may detect the direction of the face of the driver based on the driver image according to another method of determining the direction of the face represented in the image.

When the detected direction of the driver's face deviates from a predetermined allowable range centered on the traveling direction of the vehicle 10, the determination unit 31 determines that the driver is directed in a direction different from the traveling direction of the vehicle 10. The determination unit 31 may determine that the driver is directed in a direction different from the traveling direction of the vehicle 10 even when the face region cannot be detected from the driver image. Each time the driver image is acquired, the determination unit 31 may detect the direction of the face of the driver as described above. Then, the determination unit 31 determines that the warning condition is satisfied when the duration in which the driver is directed in a direction different from the traveling direction of the vehicle 10 is equal to or more than a predetermined time threshold.

Further, the determination unit 31 may determine an arousal level of the driver based on the plurality of driver images obtained in time series and may determine that the warning condition is satisfied when the arousal level is less than a predetermined threshold value. In this case, the determination unit 31 may determine the arousal level of the driver in accordance with a known method of determining the arousal level from a plurality of driver images obtained in time series.

The determination unit 31 notifies the holding request unit 32 and the warning control unit 34 of the determination result as to whether the predetermined warning condition is satisfied.

When the holding request unit 32 receives the determination result that the predetermined warning condition is satisfied from the determination unit 31, the holding request unit 32 notifies the driver of the hands-on request via the notification device 5. Then, the holding request unit 32 notifies the warning control unit 34 and the vehicle control unit 35 that the notification of the hands-on request has been started. Furthermore, the holding request unit 32 notifies the driver of the hands-off warning via the notification device 5 at the same time as the start of the notification of the hands-on request or when a predetermined time has elapsed from the start of the notification of the hands-on request.

Further, the holding request unit 32 increases the intensity of the hands-off warning as the elapsed time from the start of the notification of the hands-off warning is longer. For example, the holding request unit 32 notifies the hands-off warning with the first strength until the elapsed time reaches a predetermined switching time, and, on the other hand, notifies the hands-off warning with the second strength stronger than the first strength after the elapsed time reaches the predetermined switching time. Alternatively, the holding request unit 32 may change the intensity of the hands-off warning in three or more stages in accordance with the elapsed time since the notification of the hands-off warning is started.

The holding request unit 32 continues the notification of the hands-off warning until the holding request unit 32 receives a stop instruction for stopping the notification of the hands-off warning from the warning control unit 34 and stops the notification of the hands-off warning when the holding request unit 32 receives the stop instruction. After the notification of the hands-on request, the holding request unit 32 continues the notification of the hands-on request until the holding request unit 32 receives a release instruction, and the holding request unit 32 stops the notification of the hands-on request when the holding request unit 32 receives the release instruction. Further, when the stop instruction is not notified even after the predetermined grace period has elapsed since the intensity of the hands-off warning is changed to the second strength, the holding request unit 32 notifies the driver of an emergency stop warning for causing the vehicle 10 to stop in an emergency via the notification device 5.

The holding request unit 32 increases, for example, the volume of the warning sound from the speaker included in the notification device 5 as the intensity of the hands-off warning becomes stronger. Alternatively, the holding request unit 32 increases the luminance of the warning display by the display device or the light source included in the notification device 5 as the intensity of the hands-off warning increases. Alternatively, the holding request unit 32 may shorten the blinking interval of the warning display by the display device or the light source of the notification device 5 as the intensity of the hands-off warning becomes stronger. Further, the holding request unit 32 may increase the vibration of the vibrator included in the notification device 5 as the intensity of the hands-off warning increases. Furthermore, in a case where the notification device 5 includes a plurality of devices, the holding request unit 32 may increase the number of devices that perform the hands-off warning as the intensity of the hands-off warning increases.

The holding determination unit 33 determines whether or not the driver has held the steering wheel. For example, when the holding determination unit 33 receives the detection signal from the touch sensor 4, the holding determination unit 33 determines that the driver has held the steering wheel. Alternatively, the holding determination unit 33 may determine whether or not the driver has held the steering wheel based on the driver image. In this case, the holding determination unit 33 detects the hand of the driver and the steering wheel by inputting the driver image to a classifier learned in advance so as to detect the hand of the driver and the steering wheel from the driver image. When the position of the detected hand of the driver overlaps with the position of the detected steering wheel, the holding determination unit 33 determines that the driver has held the steering wheel. Note that the holding determined unit 33 can use, as the classifier for detecting the hand of the driver and the steering wheel, a classifier similar to the classifier used by the determination unit 31 for detecting the face region.

When the holding determination unit 33 continuously receives the detection signal from the touch sensor 4 over a predetermined period, the holding determination unit 33 may determine that the driver has held the steering wheel. Alternatively, the holding determination unit 33 may determine that the driver has held the steering wheel when the position of the detected hand of the driver overlaps with the position of the detected steering wheel for each of the plurality of driver images obtained within the latest predetermined period.

When determining that the driver has held the steering wheel, the holding determination unit 33 notifies the warning control unit 34 and the vehicle control unit 35 of the determination result.

The warning control unit 34 executes control as to whether or not to continue the notification of the hand-off warning. Specifically, when the warning control unit 34 receives the determination result that the driver has held the steering wheel from the holding determination unit 33, the warning control unit 34 notifies the holding request unit 32 of the stop instruction and the release instruction. Thus, the notification of the hands-off warning and the hands-on request is stopped. In addition, after the notification of the hands-on request, when the warning control unit 34 receives the determination result that the warning condition is no longer satisfied from the determination unit 31, the warning control unit 34 notifies the holding request unit 32 of the release instruction.

Further, when the determination result that the warning condition is no longer satisfied is notified when the intensity of the hands-off warning is the first strength, the warning control unit 34 notifies the holding request unit 32 of the stop instruction even if the warning control unit 34 does not receive the determination result that the driver has held the steering wheel.

On the other hand, even if the determination result that the warning condition is no longer satisfied when the intensity of the hand release warning is greater than or equal to the second strength that is stronger than the first strength is notified from the determination unit 31, the warning control unit 34 does not notify the holding request unit 32 of the stop instruction until the warning control unit 34 receives the determination result that the driver has held the steering wheel from the holding determination unit 33. The warning control unit 34 may not notify the release instruction until the warning control unit 34 receives the determination result that the driver has held the steering wheel. Thus, when the intensity of the hands-off warning is greater than or equal to the second strength, the notification of the hands-off warning is not stopped until the driver holds the steering wheel. As described above, depending on the intensity of the warning, whether or not the driver is required to hold the steering wheel is switched in order to stop the warning. Therefore, the warning control unit 34 can prevent the driver from ignoring the hands-on request without impairing the convenience of the driver.

The vehicle control unit 35 executes autonomous driving control of the vehicle 10 according to the level of autonomous driving control applied to the vehicle 10. The level of autonomous driving control applied to the vehicles 10 may be a level capable of hands-free driving, such as level 2 defined in Society of Automotive Engineers (SAE). In addition, even if a predetermined grace period has elapsed after the intensity of the hands-off warning is changed to the second strength, the vehicle control unit 35 operates the Emergency Driving Stop System (EDSS) function when the determination result that the driver has held the steering wheel is not notified from the holding determination unit 33. That is, the vehicle control unit 35 controls to decelerate the vehicle 10 to a predetermined slow traveling speed and then stop the vehicle 10. For this purpose, the vehicle control unit 35 sets the accelerator opening degree or the brake amount so as to have a deceleration set in advance. The vehicle control unit 35 controls a power mechanism of the vehicle 10, such as an engine or a motor, according to the set accelerator opening degree. Further, the vehicle control unit 35 outputs a control signal corresponding to the set brake amount to the brake of the vehicle 10. When the vehicle 10 stops, the vehicle control unit 35 controls each unit of the vehicle 10 so as to maintain a state in which the vehicle 10 stops. That is, the vehicle control unit 35 controls the brake so that the braking amount that the vehicle 10 does not move is maintained. Further, the vehicle control unit 35 may control the shift control mechanism so that the shift position becomes the parking position or may activate the parking brake.

As described above, when the driver does not hold the steering wheel even after the predetermined grace period has elapsed since the intensity of the hands-off warning is changed to the second intensity, the vehicle control unit 35 causes the vehicle 10 to stop in an emergency, thereby the processor 23 can cause the driver to learn that it is disadvantageous to ignore the hands-on request. Therefore, the processor 23 can more effectively prevent the driver from ignoring the hands-on request.

Note that, once EDSS function is activated, the processor 23 may limit the level of autonomous driving control applicable to the vehicles 10 to a level at which the drivers are required to hold the steering wheel until the ignition switch is turned off.

Figure 4A:
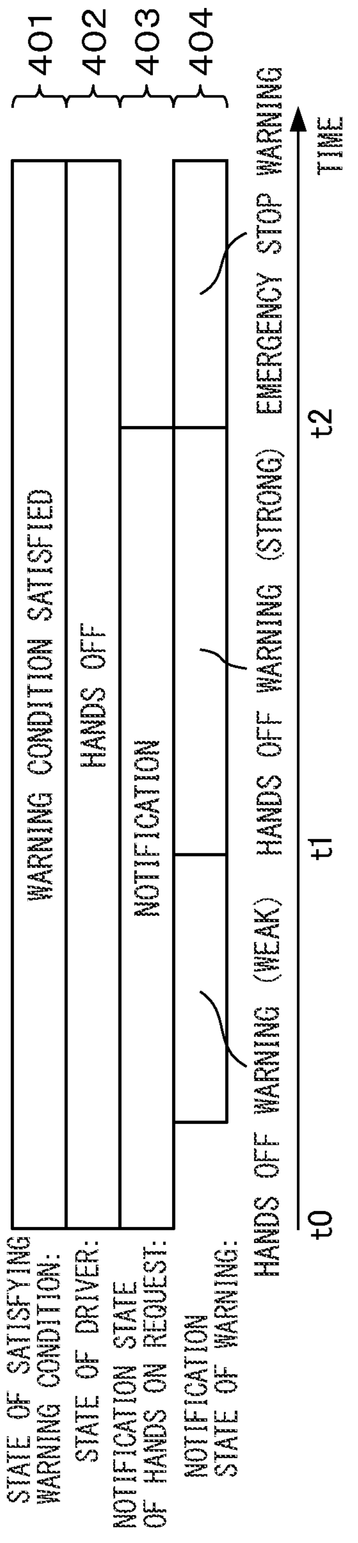
FIG. 4A is a diagram illustrating transitions in notifications of hands-off warning.
Figure 4B:
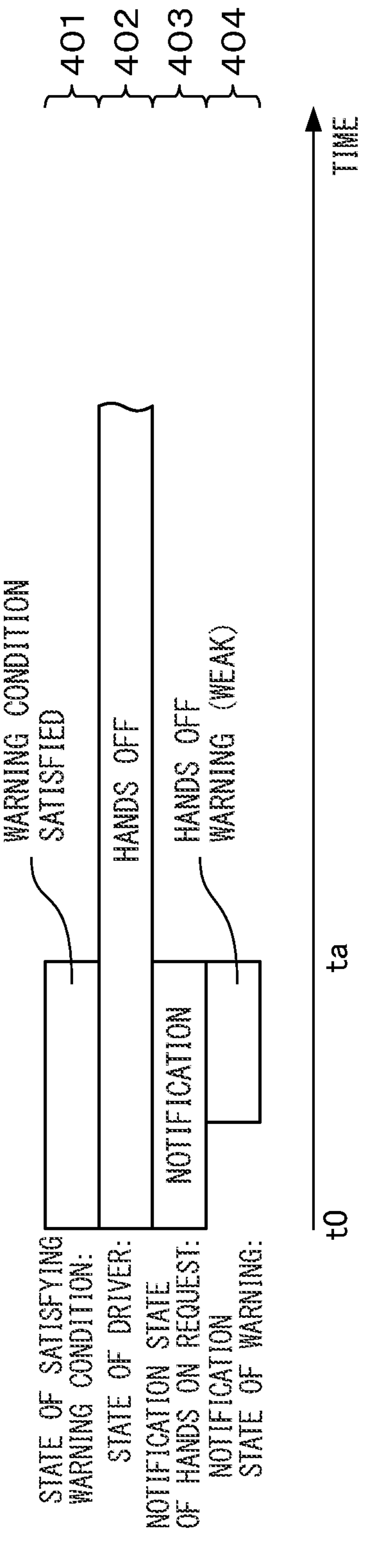
FIG. 4B is a diagram illustrating transitions in notifications of hands-off warning.
Figure 4C:
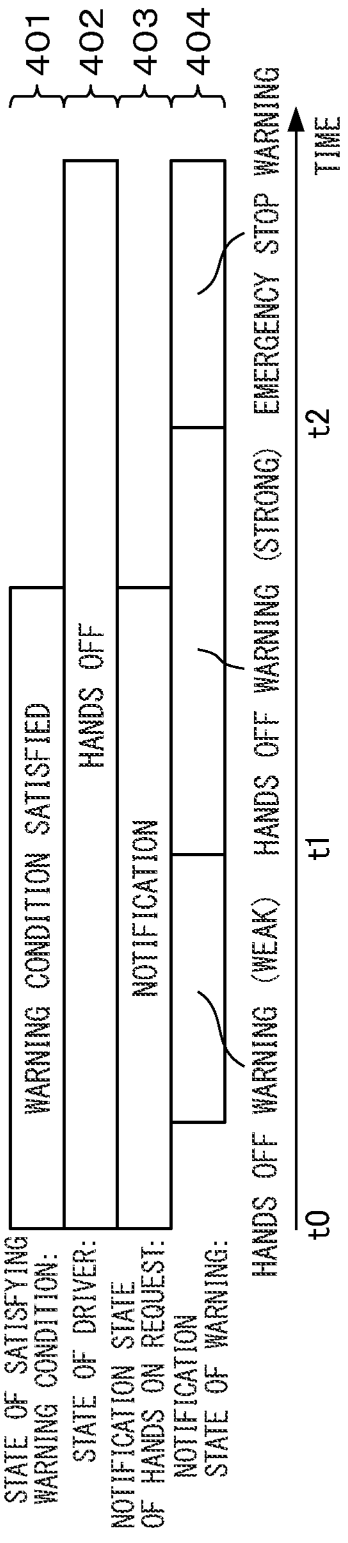
FIG. 4C is a diagram illustrating transitions in notifications of hands-off warning.

FIGS. 4A to 4C are diagrams illustrating transitions in notifications of hands-off warning, respectively. In FIGS. 4A to 4C, the horizontal axis represents elapsed times. Further, charts 401 to 404 each represent a state of satisfying a warning condition, a state of a driver related to holding the steering wheel, a notification state of a hands-on request, and a notification state of a warning. In the example illustrated in FIG. 4A, the state that the driver does not hold the steering wheel continues while the warning condition is satisfied after the notification of the hands-on request is started. As illustrated in charts 401 and 403, at time t0, the warning condition is satisfied and a notification of a hands-on request is started. Thereafter, as illustrated in chart 404, a notification of a hands-off warning is started with a first strength (weak warning). Then, at the time t1, the intensity of the hands-off warning is changed from the first strength to the second strength (strong warning). As illustrated in the chart 402, since the driver does not hold the steering wheel even thereafter, at the time t2 in which the grace period elapses from the time t1, the notified warning is switched from the hands-off warning to the emergency stop warning, and thereafter, the vehicle 10 is stopped in an emergency.

In the example illustrated in FIG. 4B, the warning condition is resolved while the intensity of the hands-off warning is the first strength (weak warning). Also in this case, as illustrated in charts 401 and 403, a notification of a hands-on-request is started at the time to. Further, as illustrated in chart 404, a notification of a hands-off warning is started with a first strength. As illustrated in the chart 402, the state that the driver releases his/her hand from the steering wheel continues. However, in this case, as illustrated in the chart 401, the warning condition is resolved at the time ta prior to the lapse of the switching time. Consequently, after the time ta, the notification of the hands-on request and the hands-off warning is stopped.

In the example illustrated in FIG. 4C, after the intensity of the hands-off warning is changed to the second strength (strong warning), the warning condition is resolved. Also in this case, as illustrated in charts 401 and 403, a notification of a hands-on request is started at the time to. Also, as illustrated in chart 404, a notification of a hands-off warning is started with a first strength. Further, at the time t1, the intensity of the hands-off warning is changed from the first strength to the second strength. Thereafter, at the time tb, the warning condition is resolved. However, after the time t1, as illustrated in charts 402 and 404, even if the warning condition is resolved, the notification of the hands-off warning is continued unless the driver holds the steering wheel. When the elapsed time reaches the time t2 without the driver holding the steering wheel, a warning to be notified is switched from the hands-off warning to the emergency stop warning, and thereafter, the vehicle 10 is stopped in an emergency.

Figure 5:
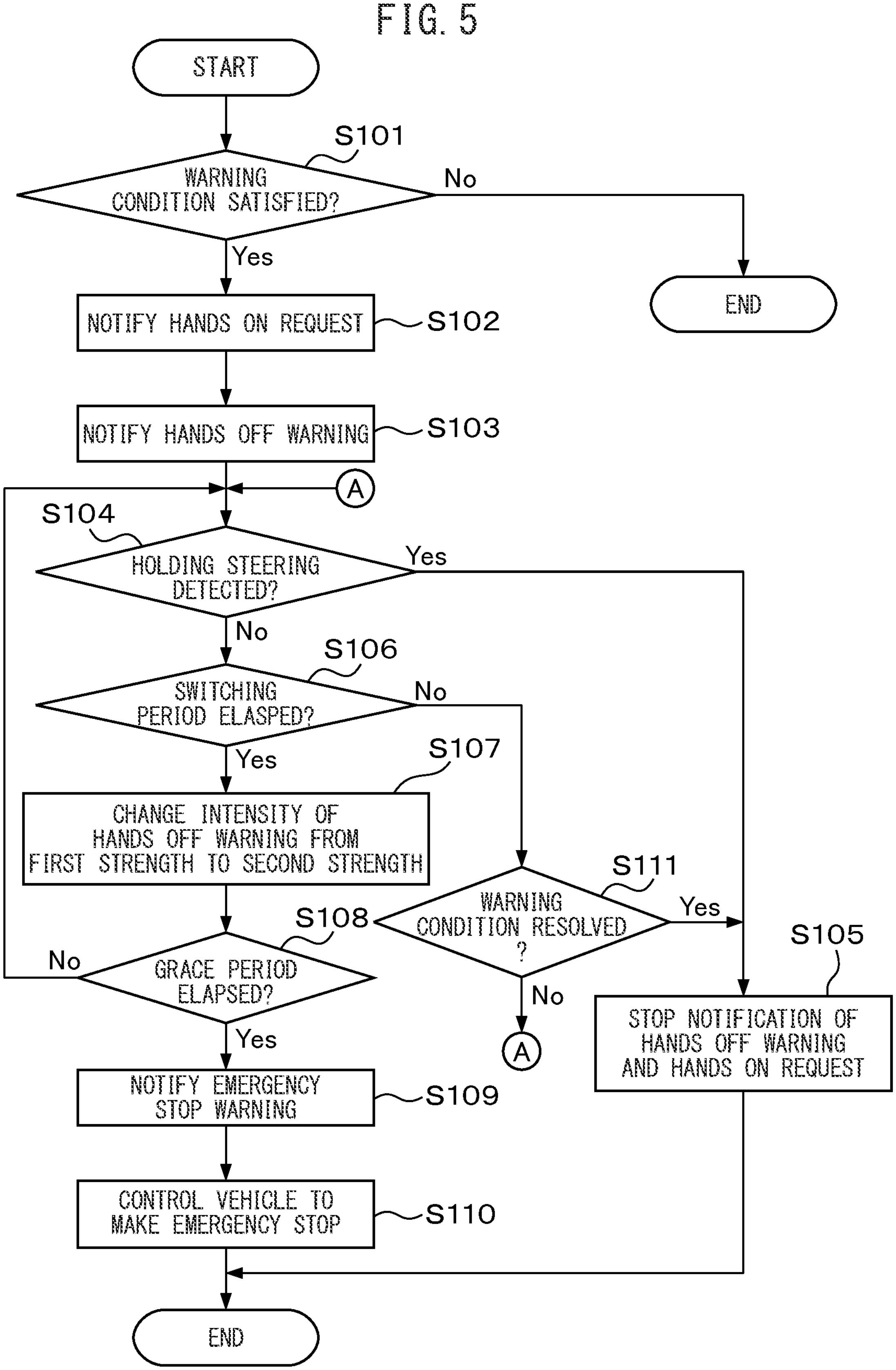
FIG. 5 is an operation flowchart of the vehicle control process.

FIG. 5 is an operation flowchart of the vehicle control process. The processor 23 may execute the vehicle control process according to the following operation flowchart.

The determination unit 31 determines whether or not the warning condition is satisfied (step S101). When the warning condition is not satisfied (No in step S101), the vehicle control unit 35 continues the control of the vehicle 10 in accordance with the level of the autonomous driving control applied to the vehicle 10. On the other hand, when the warning condition is satisfied (Yes in step S101), the holding request unit 32 notifies the driver of the hands-on request via the notification device 5 (step S102). Further, when a predetermined period of time has elapsed since the notification of the hands-on request is started, the holding request unit 32 notifies the driver of the hand-off warning with the first strength via the notification device 5 (step S103).

Thereafter, the holding determination unit 33 determines whether or not the driver has held the steering wheel (step S104). When it is detected that the driver has held the steering wheel (Yes in step S104), the warning control unit 34 causes the holding request unit 32 to stop the notification of the hands-off warning and the hands-on request (step S105). Thereafter, the vehicle control unit 35 continues the control of the vehicle 10 in accordance with the level of the autonomous driving control applied to the vehicle 10.

On the other hand, when it is not detected that the driver has held the steering wheel (step S104—No), the holding requesting unit 32 determines whether or not the switching time has elapsed since the notification of the hand-off warning was started (step S106). When the switching time has elapsed (Yes in step S106), the holding request unit 32 changes the intensity of the hands-off warning from the first strength to the second strength (step S107). Further, the processor 23 determines whether or not the grace period has elapsed since the intensity of the hands-off warning was changed to the second strength (step S108). When the grace period has not elapsed (No in step S108), the processor 23 repeats the processes of step S104 and subsequent steps.

When the grace period has elapsed (Yes in step S108), the holding request unit 32 notifies the driver of the emergency stop warning via the notification device 5 (step S109). Thereafter, the vehicle control unit 35 controls the vehicle 10 to stop the vehicle 10 (step S110).

In the step S106, when the switching time has not elapsed (No in step S106), the determination unit 31 determines whether or not the warning condition has been resolved (step S111). When the warning condition has been resolved (Yes in step S111), the processor 23 executes the process of step S105. On the other hand, when the warning condition has not been resolved (No in step S111), the processor 23 executes the process of step S104 and subsequent steps.

As described above, the vehicle control device can prevent the driver from ignoring the hands-on request.

According to the modification, the warning control unit 34 may count the number of times of automatic release in which the warning condition is not satisfied while the intensity of the hands-off warning is the first strength and the hands-off warning is released without the driver holding the steering wheel. When the number of times of automatic release becomes equal to or greater than a certain value, the holding request unit 32 may set the intensity of the hands-off warning from the beginning to the second strength. Therefore, in this case, the notification of the hands-off warning is continued immediately after the start of the notification of the hands-off warning, unless the driver holds the steering wheel.

According to the modification, the holding request unit 32 may set the intensity of the hands-off warning to a constant intensity regardless of the elapsed time from the start of the notification of the hands-off warning. In this case, after the hands-on request is notified, the warning control unit 34 may not notify an instruction to stop the hands-off warning even if the warning condition for notifying the hands-on request is no longer satisfied unless the warning control unit 34 receives the determination result that the driver has held the steering wheel from the holding determination unit 33. Therefore, in this case, even if the warning condition is no longer satisfied after the notification of the hands-on request as in the case where the intensity of the hands-off warning is the second strength in the above-described embodiment, the notification of the hands-off warning is continued until the driver holds the steering wheel.

The computer program for achieving the functions of the processor 23 of the ECU 6 according to the above-described embodiments or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle control device comprising:

a processor configured to:

determine whether or not a situation around a vehicle or a situation of a driver of the vehicle satisfies a predetermined warning condition in a case where a driving control of the vehicle is executed without the driver holding a steering wheel, notify the driver of a hands-on request for holding the steering wheel via a notification device when the predetermined warning condition is satisfied, notify the driver of a warning that the driver does not hold the steering wheel via the notification device when the predetermined warning condition is satisfied, determine whether or not the driver holds the steering wheel in response to an in-vehicle sensor signal from an in-vehicle sensor that detects an action of the driver, and continue the warning until the driver holds the steering wheel even if the predetermined warning condition is no longer satisfied after the hands-on request is notified, wherein the processor increases an intensity of the warning as an elapsed time from the notification of the hands-on request becomes longer, and wherein the processor stops the warning even if the driver does not hold the steering wheel when the predetermined warning condition is no longer satisfied while the intensity of the warning is a first strength, and continues the warning until the driver holds the steering wheel even if the predetermined warning condition is no longer satisfied while the intensity of the warning is a second strength stronger than the first strength.

2. The vehicle control device according to claim 1, wherein the processor is further configured to control the vehicle to stop the vehicle when the driver does not hold the steering wheel until a predetermined grace period elapses after the intensity of the warning is changed to the second strength.

3. A vehicle control method comprising:

determining whether or not a situation around a vehicle or a situation of a driver of the vehicle satisfies a predetermined warning condition in a case where a driving control of the vehicle is executed without the driver holding a steering wheel;

notifying the driver of a hands-on request for holding the steering wheel via a notification device when the predetermined warning condition is satisfied;

notifying the driver of a warning that the driver does not hold the steering wheel via the notification device when the predetermined warning condition is satisfied;

determining whether or not the driver holds the steering wheel in response to an in-vehicle sensor signal from an in-vehicle sensor that detects an action of the driver; and continuing the warning until the driver holds the steering wheel even if the predetermined warning condition is no longer satisfied after the hands-on request is notified, wherein the method further comprises:

increasing an intensity of the warning as an elapsed time from the notification of the hands-on request becomes longer, stopping the warning even if the driver does not hold the steering wheel when the predetermined warning condition is no longer satisfied while the intensity of the warning is a first strength, and continuing the warning until the driver holds the steering wheel even if the predetermined warning condition is no longer satisfied while the intensity of the warning is a second strength stronger than the first strength.

4. A non-transitory recording medium that stores a computer program for vehicle control, the computer program causing a processor mounted on a vehicle to execute a process comprising:

determining whether or not a situation around the vehicle or a situation of a driver of the vehicle satisfies a predetermined warning condition in a case where a driving control of the vehicle is executed without the driver holding a steering wheel;

notifying the driver of a hands-on request for holding the steering wheel via a notification device when the predetermined warning condition is satisfied;

notifying the driver of a warning that the driver does not hold the steering wheel via the notification device when the predetermined warning condition is satisfied;

determining whether or not the driver holds the steering wheel in response to an in-vehicle sensor signal from an in-vehicle sensor that detects an action of the driver; and continuing the warning until the driver holds the steering wheel even if the predetermined warning condition is no longer satisfied after the hands-on request is notified, wherein the process further comprises:

increasing an intensity of the warning as an elapsed time from the notification of the hands-on request becomes longer, stopping the warning even if the driver does not hold the steering wheel when the predetermined warning condition is no longer satisfied while the intensity of the warning is a first strength, and continuing the warning until the driver holds the steering wheel even if the predetermined warning condition is no longer satisfied while the intensity of the warning is a second strength stronger than the first strength.

* * * * *